United States Patent [19]

Seksaria et al.

[11] Patent Number: 5,244,745
[45] Date of Patent: Sep. 14, 1993

[54] STRUCTURAL SHEET AND PANEL

[75] Inventors: Dinesh C. Seksaria, Murrysville; Glenn W. Jarvis, Allison Park, both of Pa.

[73] Assignee: Aluminum Company of America, Pittsburgh, Pa.

[21] Appl. No.: 868,970

[22] Filed: Apr. 16, 1992

[51] Int. Cl.⁵ .............................................. B32B 3/28
[52] U.S. Cl. .................................. 428/593; 428/604; 428/594; 52/792
[58] Field of Search ................. 428/593, 604, 594; 52/792

[56] References Cited

U.S. PATENT DOCUMENTS

| Re. 7,198 | 7/1876 | Barker et al. | 428/604 |
|---|---|---|---|
| 662,567 | 11/1900 | Lipowska et al. | 428/604 |
| 2,152,297 | 3/1939 | Wilson | 428/604 |
| 2,441,476 | 5/1946 | Ewald | 428/594 |
| 3,011,602 | 12/1961 | Ensrud et al. | 189/34 |
| 3,227,598 | 1/1966 | Robb | 161/68 |
| 3,507,634 | 4/1970 | O'Driscoll | 29/191.4 |
| 3,525,663 | 8/1970 | Hale | 52/792 |
| 3,876,492 | 4/1975 | Schott | 161/68 |
| 4,025,996 | 5/1971 | Saveker | 428/594 |
| 4,411,121 | 10/1983 | Blacklin et al. | 52/792 |
| 4,703,159 | 10/1987 | Blair | 428/594 |

FOREIGN PATENT DOCUMENTS

| 916284 | 7/1949 | Fed. Rep. of Germany | 52/792 |
|---|---|---|---|
| 61608 | 5/1968 | Fed. Rep. of Germany | 52/792 |
| 284305 | 7/1952 | Switzerland | 52/792 |
| 438648 | 12/1967 | Switzerland | 52/792 |
| 2051909A | 1/1981 | United Kingdom | 52/742 |

OTHER PUBLICATIONS

Webster's New Collegiate Dictionary, G. & C. Merriam Co., 1977, "Sigmoid", p. 1079.
W. C. Herbein et al. "Minimizing the Weight and Cost of an Aluminum Deck Lid," presented at Society of Automotive Engineers Meeting, Jun., 1981.

Primary Examiner—John Zimmerman
Attorney, Agent, or Firm—Dressler, Goldsmith, Shore, Sutker & Milnamow, Ltd.

[57] ABSTRACT

The invention relates to a structural sheet formed with cup-shaped projections in which the sidewalls are formed by a sigmoidal line of revolution to provide for more uniform distribution of stress in the structural sheet. There is also provided a novel two-component structural panel which incorporates the advantages of such a structural element to eliminate depressions in the outer panel member which would present "read through" problems.

7 Claims, 1 Drawing Sheet

STRUCTURAL SHEET AND PANEL

FIELD OF THE INVENTION

This invention relates to a metal sheet that is formed of a plurality of cup-shaped elements that is light in weight but provides relatively high strength and stiffness. The sheet is particularly adaptable for use as a panel component in such products as an automobile engine hood, roof, deck lid or other environments, where it is desired to employ a smooth outer sheet and a reinforcing sheet that is strong and stiff yet relatively light in weight.

BACKGROUND OF THE INVENTION

It has been conventional to make panels for use in automobiles or the like made up of two components that must have the requisite strength and rigidity to meet functional performance characteristics yet be relatively light in weight. To keep the overall panel weight as light as possible, configurations such as various rib patterns and protrusions in the sheet forming the structural support for the panel have been employed. One such approach is an array of shapes such as frusta of cones, but these are limited in depth and angle by the formability of the metal and also require use of expensive matched forming dies. Such arrangements result in undesirable areas of stress concentrations, especially at the juncture of the sidewalls with adjacent planar portions. Another deficiency with respect to these types of constructions is that these shapes may result in "visible" patterns on the outer panel sheet, which is not aesthetically acceptable.

SUMMARY OF THE INVENTION

The present invention is directed to a structural sheet that can be used in a variety of configurations, and particularly to such a sheet that can be used in a two-component structural panel for use wherever it is desired to have at least one exposed smooth and stiff metallic finished surface and a strong yet light in weight structural support such as for automobile engine hoods, roofs, etc. It is important that the novel panel structure be light in weight, yet have sufficient strength for its intended use. It is desirable that this be made in a cost-efficient method utilizing, locally, only a cylindrical punch and die and not require for its formation a more expensive complicated matched die set. To obtain the desired strength and stiffness, the sheet is formed with a series of projections, which construction is known to provide high strength with minimum weight. It is particularly important that the shape of the projections be such as to minimize, if not eliminate inordinate stress concentrations in the areas where the sidewalls interconnect to the upper and lower portions of the structural sheet itself and to provide more equal stress distribution throughout the sidewall. It is to these features that the present invention is directed. In a typical embodiment the structural panel segment includes spaced flat portions that can be adhesively secured to an outer smooth metallic sheet to which it is to be connected.

While the particular structural panel member can be used in a number of different situations, in a preferred embodiment, it is employed as part of a two-component panel for use with automobiles. In the particular illustrated embodiment, both of the members are made of a thin-gauge aluminum alloy sheet, but this is by way of example, and the invention is not to be so limited. Generally speaking, the panel consists of an outer sheet that can be formed in the desired aerodynamic shape and an inner structural member adhesively secured to the outer sheet and providing the majority of the required strength and stiffness.

The closest prior art of which the applicant is aware is U.S. Pat. No. 3,011,602, entitled "Panel Construction," which is made of a flat sheet and a formed reinforcing sheet in which the formations are generally pyramid in shape. This design is subject to the disadvantage of creating inordinate stress concentration areas where the sidewalls join the flat upper portions, and also where the sidewalls merge with the sheet at the base of the pyramids. This patent also discloses inverted cup-shaped projections that are curved, but such sidewalls are not sigmoidal, and as is clear from the drawings, the junction of the sidewalls and the flat portions are areas of undesirable stress concentrations.

Other related prior art that discloses similar developments to that found in U.S. Pat. No. 3,011,602 include U.S. Pat. Nos. 3,227,598; 3,507,634; and 3,876,492.

In the instant application, there is provided a sheet which is formed with the utilization of a local cylindrical punch and die tool whereby the sheet can be formed with relatively deep cup-shaped elements. As an added advantage, the use of a local cylindrical punch and die tool makes it possible to more effectively match a complex shape of another panel as well as more easily adjust the cup-shaped element height during tool development and for subsequent product variations. The utilization of a local cylindrical punch and die allows one to more effectively deal with outer panel dimensional variability and to produce more consistent product quality.

Specifically, the sidewalls of the cup-shaped elements of the novel structural sheet of this invention is made by employing locally a punch and a die having a cylindrical shape to develop the sigmoidal shape of the cup-shaped elements instead of a die having straight or curved sidewalls that form relatively sharp corners with a flat wall where undesirable stress concentrations can occur. "Sigmoidal" is a configuration that is curved in two directions like the letter S, the outer portions of which merge into the upper and lower adjacent portions of the sheet 14 in which it is formed.

This sigmoidal shape of the cup sidewall results in more equal stress distribution and minimizing if not totally eliminating inordinate stress concentrations in the areas where the sidewalls of the cup-shaped elements flow into the upper flat top portion as well as the cup lower wall portion where it blends into the sigmoidal shape of an adjacent cup-shaped element. The cylindrical diameter of the local punch and die are adjusted such that the local die diameter is much larger than the local punch diameter. Further, the local cylindrical punch and die diameter differences result in more uniform strain distribution in the cup-shaped element sidewalls due to the absence of friction between the sheet and the tooling in the sidewalls. The sigmoidal shape is less rigid locally and thus does not pull the outer sheet of the panel towards it as strongly during the adhesive curing process when the structural sheet is secured to the outer panel sheet. This results in alleviation of the "read through" or visibility of the inner sheet from the outside at the completion of the curing process.

The invention can best be understood when considered in conjunction with the accompanying drawing, in which:

DETAILED DESCRIPTION

Figure 1:
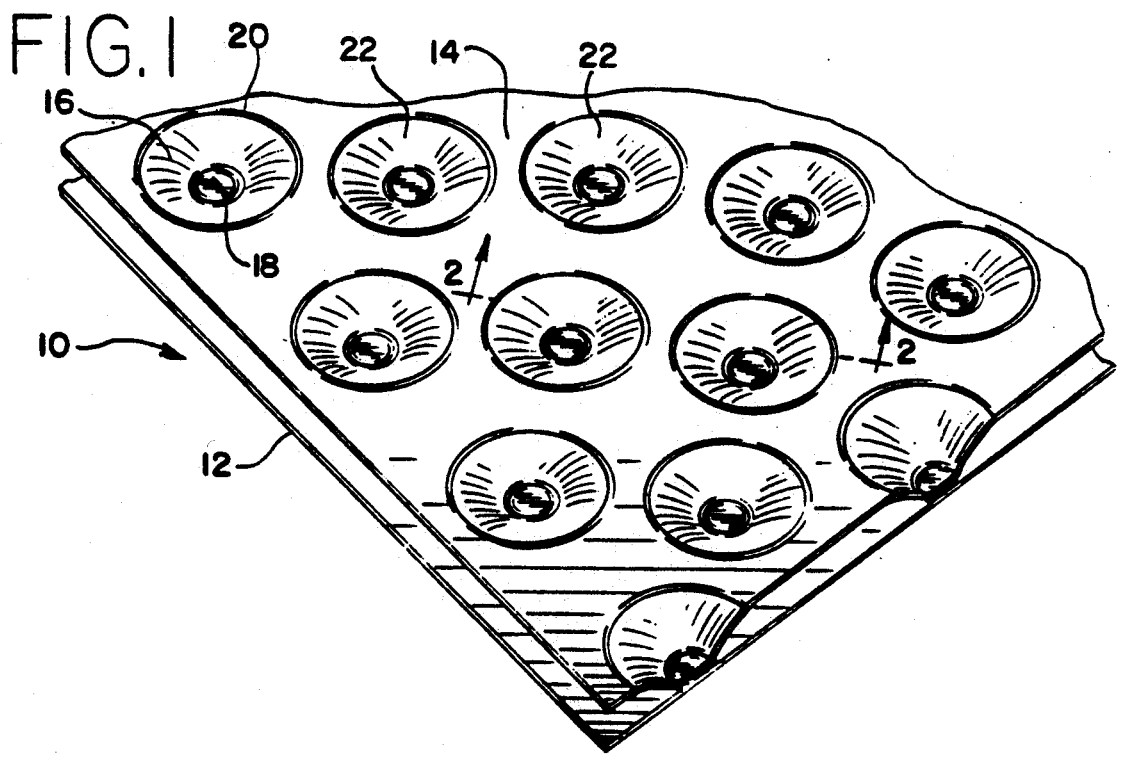
FIG. 1 is a generally inverted perspective view of a portion of the two-component panel.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Referring first to FIG. 1, there is illustrated a structural panel 10 which is shown in the inverted position. The structural panel consists of a first outer aluminum alloy sheet 12 having substantially smooth inner and outer surfaces and a second inner rigidifying sheet 14 also made of an aluminum alloy. The outer panel can be formed with a constant or varying curved surface as desired. These sheets have a thickness on the order of 30–80 mils.

The inner rigidifying sheet is formed by using a cylindrical punch and die arrangement to provide a plurality of generally cup-shaped configurations 16 having generally circular top and bottom cross sections 18,20, respectively. The local cylindrical punch and die assemblage (not shown) has a plurality of projections that are circular in cross section and have an essentially cylindrical sidewall shape that are mounted on a relatively flat surface. The local die sections are circular in cross section and essentially cup-shaped. They are also mounted on a relatively flat surface. During the forming process, the sheet is formed of comparably shaped projections 16 having upper and lower generally planar portions 18,20.

Figure 2:
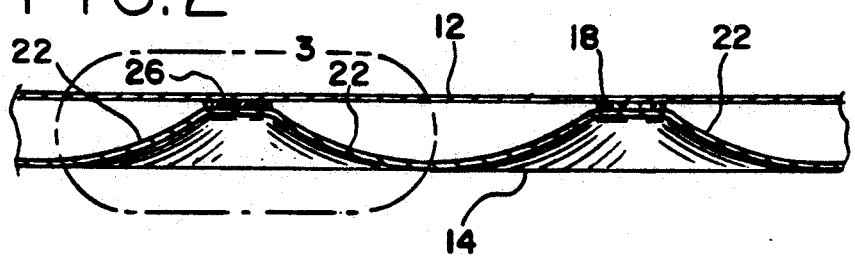
FIG. 2 is a section at plane "P" of FIG. 1.

The panel 10 is formed by connecting the structural sheet 14 to the inner surface of the outer aluminum sheet by an adhesive 26 as shown in FIG. 2, which secures the upper planar portions 18 of the cup-shaped elements 16 to the inner surface of the outer sheet 12. The size of the flattened top 18 is designed to insure stiffness compatibility between the mating surfaces of the sheets 12 and 14. The exact dimensions of the projections and their disposition are optimized for the specific strength and stiffness required of the panel.

Figure 3:
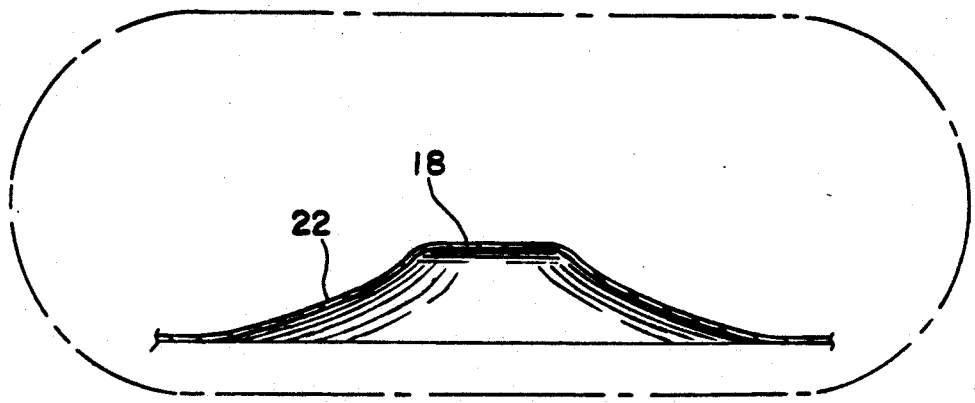
FIG. 3 is an enlarged view of one of the cup-shaped elements of which the structural sheet component is composed.

Referring now specifically to FIG. 3, there is shown in cross section one of the inverted cup-shaped elements 16 which illustrates the sigmoidal configuration of the sidewall. It is important to note that due to the sigmoidal configuration, the juncture between the sigmoidal sidewall 22 and the flat upper portion 18 of the cup-shaped element is a smooth transition resulting in minimizing if not altogether eliminating inordinate stress concentrations at the juncture where the upper portion of the sidewall 22 merges into the flat central portion 18 of the top of the inverted cup-shaped element. Also, it is to be noted that the lower portion of the sidewall similarly merges into the adjacent portion of the sheet and here too stress concentrations are substantially minimized. Such a configuration also provides for a more equal stress distribution in the sidewalls.

It is again important to note that the sigmoidal shape is less rigid locally and thus does not tend to pull the outer sheet towards the projections during the curing of the adhesive 26 joining the projections and the outer sheet. This prevents the formation of depressions in the outer sheet, which is known in the trade as "read through" difficulties.

While it is to be noted that there is illustrated a two-component panel construction wherein the unique structural sheet portion has a generally uniform configuration, this is by example only. The projections need not be uniformly disposed and the sheet can be used in other configurations, such as a sandwich wherein the structural component is disposed between two flat sheet members. Also, while the panel as made up of aluminum alloy sheets, it, of course, can be made up of other metallic materials if desired.

However, it is intended to cover by the following claims all embodiments which fall within the true spirit and scope of the invention.

What is claimed is:

1. A high-strength light weight sheet adapted for use as a panel component consisting of a shaped sheet formed of a plurality of generally cup-shaped spaced elements having a generally flat top portion, a lower generally planar portion, and sidewall portions formed by a sigmoidal line of revolution, which sidewall portions blend smoothly into the flat top portion and adjacent lower generally planar portions providing for uniform stress concentration in the elements and the elimination of stress concentrations at the upper and lower portions of said cup-shaped elements.

2. A sheet member as set forth in claim 1 in which the cup-shaped elements are uniformly spaced throughout the major portion of the sheet.

3. A sheet member as set forth in claim 1 which is constructed of a thin gauge aluminum alloy.

4. A sheet member as set forth in claim 1 in which the cup-shaped elements include a generally flat circular top and in which the sigmoidal shaped sidewall sections is formed between the circular top portion and a generally flat lower portion.

5. A two-component structural panel consisting of a first sheet having substantially smooth inner and outer surfaces and a second rigidifying, high-strength light weight sheet formed of a plurality of inverted cup-shaped elements having a generally flat top portion and sigmoidal-shaped sidewalls formed between the flat top portions and lower generally planar surfaces, which sidewalls blend smoothly into the flat top portions and the lower generally planar surfaces, and means securing said upper planar surface to the inner surface of said first sheet.

6. A structural panel as set forth in claim 5 in which the first sheet is constructed of a thin-gauge aluminum alloy.

7. A structural panel as set forth in claim 5 in which both sheets are constructed of a thin-gauge aluminum alloy.

* * * * *